Aug. 20, 1929.   C. G. WENNERSTROM   1,725,034
SPEED REDUCING GEAR
Filed Sept. 21, 1928   2 Sheets-Sheet 1
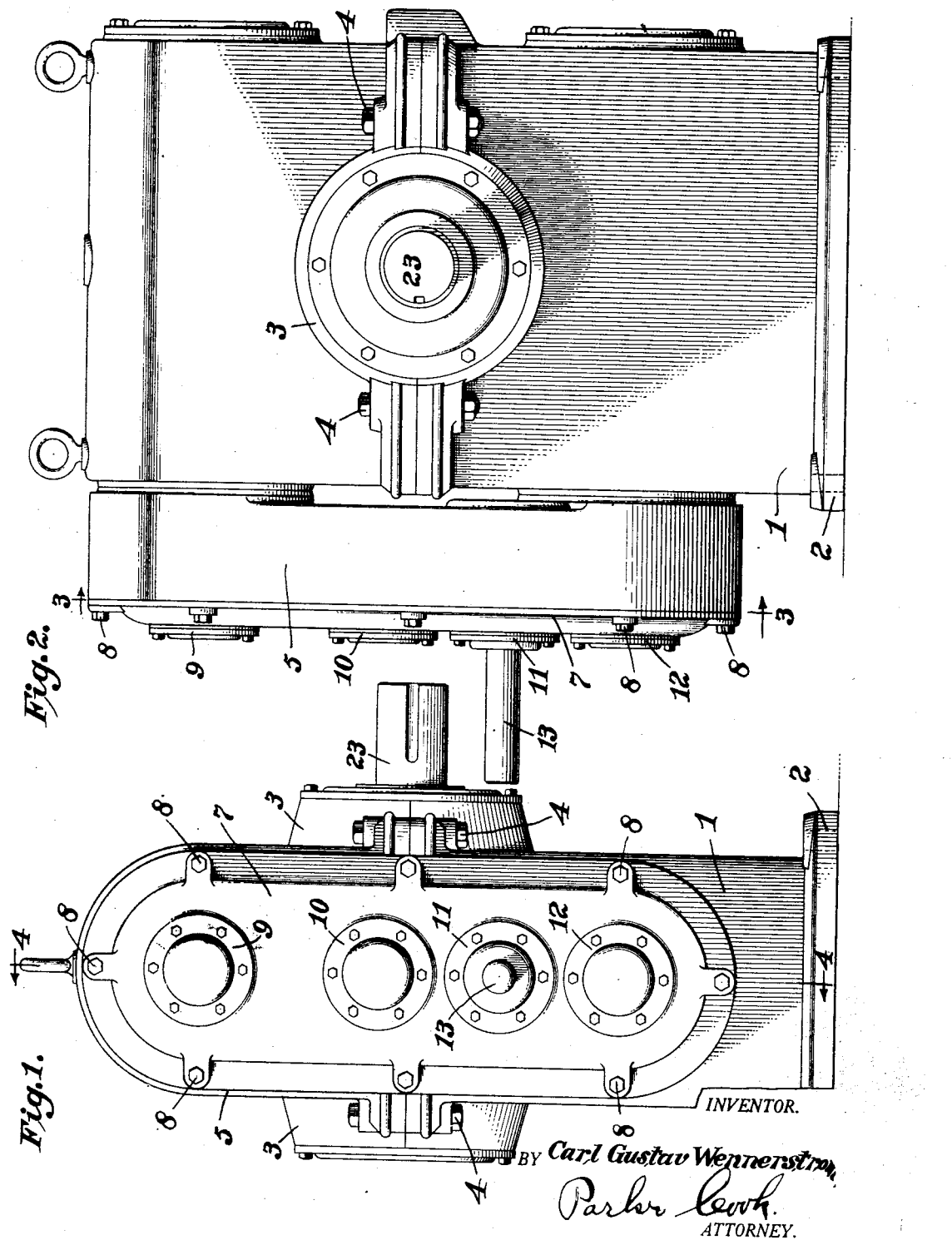

INVENTOR.
BY Carl Gustav Wennerstrom
Parker Cook
ATTORNEY.

Patented Aug. 20, 1929.

1,725,034

UNITED STATES PATENT OFFICE.

CARL GUSTAV WENNERSTROM, OF EVANSTON, ILLINOIS, ASSIGNOR TO FOOTE BROS. GEAR & MACHINE CO., OF CHICAGO, ILLINOIS, A CORPORATION OF ILLINOIS.

SPEED-REDUCING GEAR.

Application filed September 21, 1928. Serial No. 307,509.

My invention relates to new and useful improvements in power transmitting gearing and more especially to speed reducers or reduction gearing, and has for an object to provide a device consisting of, primarily, a high speed shaft on which there is slidingly mounted a double helical gear, one part of which meshes with a helical gear mounted on a worm shaft while the other part of the helical pinion meshes with an intermediate helical gear, which in turn meshes with a further helical gear mounted on a worm shaft, and these two worm shafts in turn being oppositely disposed, and driving a worm wheel, which in turn is connected with the ultimate driven shaft.

One of the objects of the present invention is to provide a more balanced or even torque as applied to the ultimate driven member by balancing the end thrust on the driving shaft and in this manner, balancing the load on the two worms that drive the ultimate driven worm wheel and shaft.

Still another object of the invention is to provide a speed reduction device wherein the load is evenly balanced between the two worms, which is accomplished by having what might be termed, a double helical pinion which is floated on the drive shaft, and by using a right-hand helical gear connected with one worm and a left-hand gear connected to the other worm, so that the double helical pinion may move back and forth on the shaft due to the helix angle of the teeth of the gears and will locate itself at a point where equal load is distributed in both directions, so that the turning effort on the ultimate driven worm wheel will be at all times equal.

Still another object of the invention is to provide a speed reducer of reduction gear, consisting of but few parts, simple in construction and relatively cheap to manufacture.

With these and other objects in view, the invention consists of certain new and novel arrangements and combination of parts as will be hereinafter more fully described and pointed out in the claims.

Referring now to the drawing showing a preferred embodiment:—

Fig. 1 is a front elevation of my improved speed reducer,

Fig. 2 is a side elevation of the same,

Referring now, more particularly, to the several views, there is shown a casing 1, having the base 2, while extending out from the main portion of the casing on each side are the bearing blocks 3, which in turn are bolted as at 4 to their respective halves, so that the parts may be assembled and removed when necessary.

Figure 4:
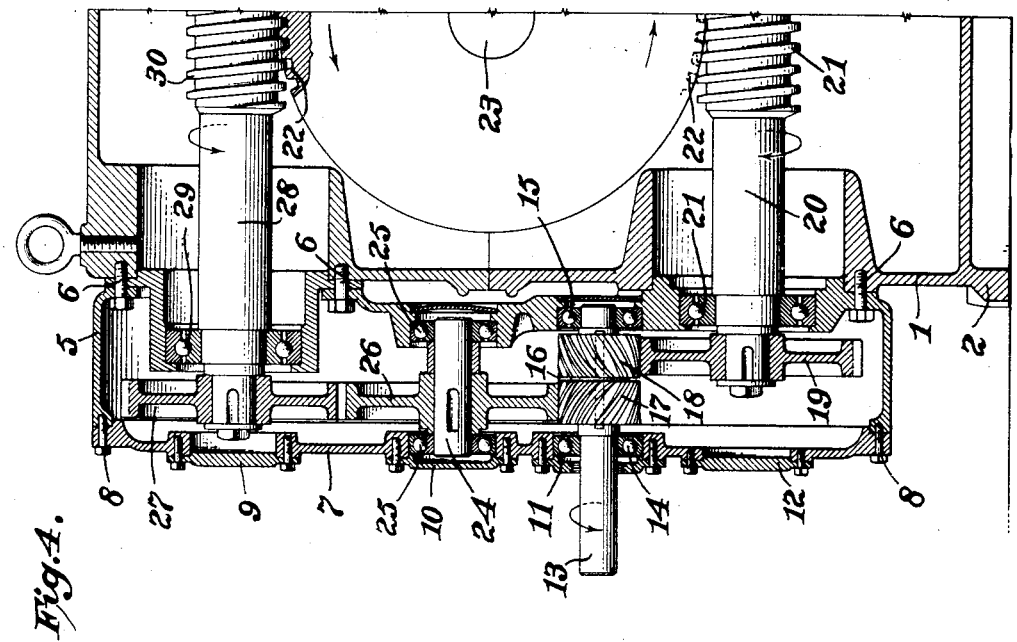
Fig. 4 is a sectional view taken on line 4—4 of Fig. 1 looking in the direction of the arrows.
Figure 3:
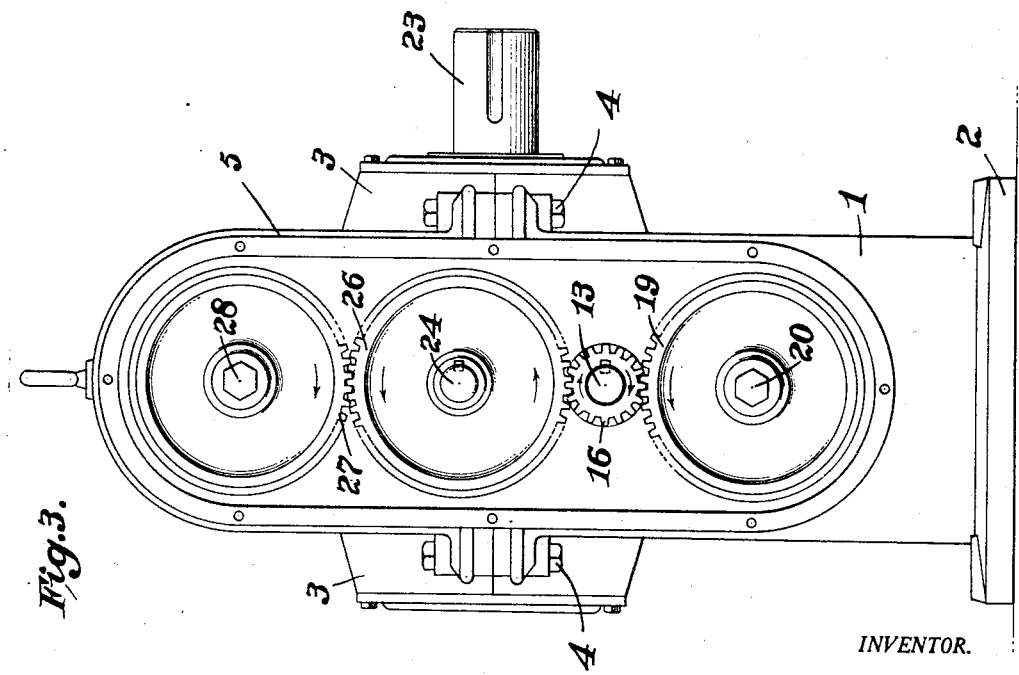
Fig. 3 is a vertical section view taken on line 3—3 of Fig. 2.

As may be plainly seen in Figs. 2 and 4, there is a further casing 5, secured by the bolts 6, (Fig. 4) to the casing 1, while a cover-plate 7 may be seen which is bolted to the casing 5 by the plurality of bolts 8 distributed around the cover-plate.

Secured on this cover-plate 7 are also the small circular hand plates 9, 10, 11 and 12 which are disposed opposite the shafts and stub-shafts which shafts will be shortly mentioned.

Referring now, to the high speed driving shaft 13, it will be seen that it is mounted in the ball-races 14 and 15, the one ball-race being mounted in the cover-plate 7 and the other race mounted in the rear part of the casing 5.

This high speed shaft 13 has splined and mounted thereon, what might be termed, a double-toothed helical gear 16 which is cut on the order of a herringbone gear which is free to move or float for a short distance lengthwise of its shaft 13.

For the sake of convenience of illustration and description, one part of the herringbone gear is numbered 17 while the other portion is numbered and will be referred to as the part 18, although it is to be, of course, understood that it is one integral structure and provided with teeth of the herringbone type, that is right and left hand.

Intermeshing with the part 18 of the gear 16, there is a lower helical gear 19 which is mounted on the end of a worm shaft 20, which shaft in turn is mounted at one end in ball-race 21, the ball-race being in turn supported in its chamber in the casing 5, while the other end of the shaft is suitably mounted in another ball-race (not shown).

A fragmentary portion of the worm 21 may be seen in Fig. 4 which meshes with the large worm wheel 22, which worm wheel in turn is keyed to the ultimate driven shaft 23, the shaft being supported in the bearings 3.

Still referring to Fig. 4, it will be seen that a small stub-shaft 24 is mounted in the races 25, on which shaft is keyed the intermediate helical gear 26, which intermediate gear meshes with the other half 17 of the floating pinion 16, this intermediate gear 26 also intermeshing with the top helical gear 27, which latter gear is keyed to the end of the second worm shaft 28, the shaft being mounted in the ball-race 29 at one end and a similar race (not shown) at its opposite end.

The worm 30 of this shaft also meshes with the heretofore mentioned worm wheel 22 at a point diametrically opposite the first mentioned worm shaft.

With this floating double-toothed pinion arrangement the two worms will be pulling the same load, for instance: consider that the lower worm 21 is so positioned it takes hold first, when it starts to rotate, due to the rotation of the high speed shaft 13, the pinion 16 and the helical gear 19. Then, in addition to the torque load on the pinion 16, an end thrust is produced on the pinion due to the helix angle of the teeth of the portion 18, and this end thrust will move the pinion slightly on the shaft until this force is counterbalanced by an equal end thrust reaction from the helical gears 26 and 27, which are in the train of the worm shaft 28, it being remembered that the intermediate gear 26 intermeshes with the portion 17 of the pinion 16, and as soon as the end thrust on the floating pinion 16 is balanced, the torque load will also be balanced and therefore the two worm shafts 20 and 28 will be pulling the same load, or exerting the same turning effort on the worm wheel 22 which is keyed to the driven shaft 23.

From the foregoing it will be seen that by having a herringbone pinion floatingly mounted on its shaft and intermeshing with right and left gears the same amount of torque is transmitted to both worm shafts, as a slight movement back and forth of the pinion 16 parallel to the shaft, due to the helix angle of the gears, will allow the pinion to move and locate itself at the point where equal load is distributed in both directions.

It will be noticed that the gear train is such that the two worms properly run in the opposite direction and the worms on the worm shafts are oppositely disposed with regard to the worm wheel.

It will also be understood that although I have shown the driven shaft 13 and its herringbone gear mounted for lengthwise movement thereon, it would be possible to rigidly fasten this pinion on the shaft and let the shaft and pinion float as a unit and accomplish practically the same results, although I prefer, for mechanical reasons, to use the arrangement as shown, that is, float the pinion on the shaft rather than float the shaft and pinion.

From the foregoing it will be seen that I have produced what might be termed a duplex reducer so arranged that the load is equalized on the two worms which is the only practical manner in which a multiple worm arrangement can be utilized.

I am aware that it is old, as shown in Patent 1,618,927, to provide worms meshing with worm gears for balancing the load, but applicant, it will be seen, uses two worms in connection with one gear, and this, in connection with a balanced arrangement of right and left-hand helical gears and a floating double face pinion, as will be clearly understood from the above description.

Of course the casings will be packed with grease and the small cover-plates may be easily removed when necessary to oil or grease the several parts.

Many slight changes might be made without departing from the spirit and scope of the invention.

Having thus described my invention, what I claim as new and desire to hereby secure by Letters Patent is:—

1. A speed reducer comprising a driving shaft, a pinion thereon oppositely positioned sets of teeth on said pinion, a driven shaft and a worm wheel secured thereto, oppositely positioned worm shafts meshing with said worm wheel, both of said worm shafts having a helical gear on their other respective ends, one of said helical gears meshing with one set of teeth of the pinion, an intermediate helical gear, and the other of said first mentioned helical gears meshing with said intermediate helical gear, and said intermediate helical gear meshing with the remaining set of teeth on said pinion, and the said pinion mounted for slight lateral movement whereby the load will be equalized on the two worm shafts.

2. A speed reducer comprising a driving shaft, a pinion provided with right and left hand teeth thereon, said pinion capable of a slight lateral movement on said shaft, a driven shaft and a worm wheel rigidly secured thereto, worm shafts oppositely positioned with respect to the worm wheel for driving the said worm wheel, right and left hand helical gears respectively mounted on the remaining respective ends of the said worm shaft, one of said helical gears meshing directly with the one set of teeth of the pinion, an intermediate gear meshing with the remaining teeth of the pinion and also meshing with the helical gear on the other said worm shaft, whereby the worm shafts are revolved in the opposite direction and the said laterally movable pinion positioning itself to thereby balance and equalize the driving effort transmitted by each train from the driving to the driven shaft.

3. Speed reducer comprising a driving shaft and a floating pinion thereon, said pinion being of a herringbone type, a driven shaft and a worm wheel secured thereto, two oppositely positioned worm shafts for driving the worm wheel, each of which is provided with a helical gear at its end, the helical gear on one worm shaft meshing with one portion of the herringbone type pinion, an intermediate helical gear having its teeth extending in the opposite direction from the teeth of the helical gear that meshes with said pinion and said intermediate gear also meshing with the helical gear on the other of said worm shafts whereby the pinion on the driving shaft will automatically position itself to thereby equalize the driving movement on the two said worm shafts.

4. A speed reducer comprising a driving shaft and a driven shaft, a worm wheel on said driven shaft, two oppositely positioned worms for driving said worm wheel on the driven shaft, helical gears on the ends of said worm shafts, an intermediate gear, a slightly movable herringbone type pinion on said driving shaft, said intermediate gear meshing with one portion of the pinion, the helical gear on one of said worms meshing with the other portion of said pinion, and said pinion adjusting itself with relation to the intermediate gear and to the helical gear of one worm shaft to equalize the driving efforts on the opposite sides of the said worm wheel on the driven shaft.

5. A speed reducer comprising a driving shaft and a driven shaft, a worm wheel on the driven shaft, two oppositely positioned worm shafts for driving said worm wheel, helical gears on the ends of said worm shafts, an intermediate gear, a movable pinion on the driving shaft of the herringbone type, a helical gear of one shaft and the intermediate helical gear meshing with said pinion whereby the worm shafts are rotated in the opposite direction and the turning movement is equalized on the two said worms.

6. A speed reducer comprising a casing, a driven shaft within the casing and a worm wheel connected thereto, worm shafts for driving said worm wheel, a further casing, a driving shaft mounted in said further casing, helical gears mounted on the ends of said worm shaft, a floating pinion on the driving shaft meshing with one of said helical gears, an intermediate gear also meshing with said pinion and meshing with the other said helical gear on the other said worm shaft, the said pinion being of the herringbone type and slightly movable laterally whereby the turning movement from the driving shaft to the driven shaft is equalized between the two worms.

7. A speed reducer comprising a driving and driven shaft, a worm wheel on the driven shaft, two worm shafts, a right hand helical gear connected to one worm and left hand helical gear connected to the other worm, an intermediate helical gear, a double helical pinion on the driving shaft and within the train and said double helical pinion movable slightly laterally whereby, due to the helical angle of the gears the pinion will locate itself at a point where equal load is distributed to both worm shaft and the driven shaft.

In testimony whereof I affix my signature.

CARL GUSTAV WENNERSTROM.